Feb. 2, 1943.   R. J. WILKIE   2,310,140
BAND SAW PACKAGE
Filed June 25, 1941   2 Sheets-Sheet 1

Inventor
Robert J. Wilkie

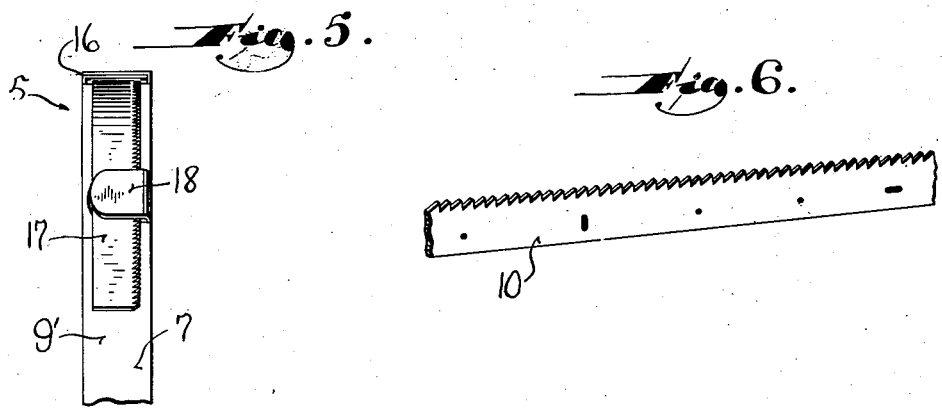
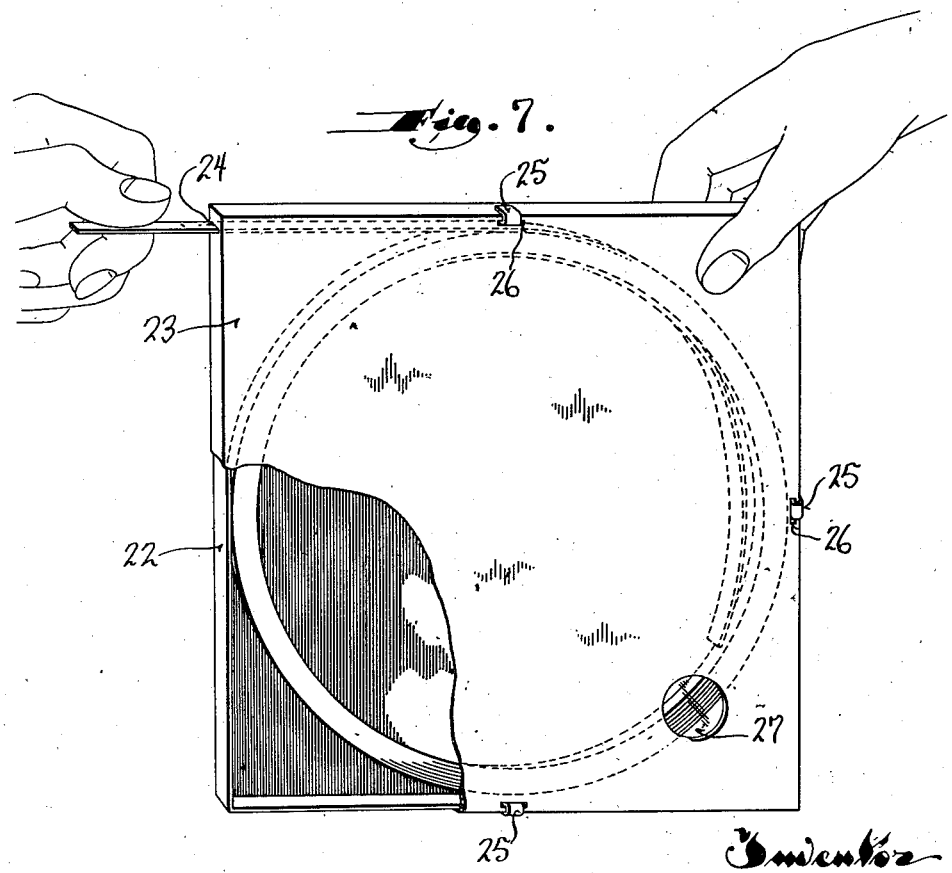

Patented Feb. 2, 1943

2,310,140

UNITED STATES PATENT OFFICE 2,310,140

BAND SAW PACKAGE

Robert J. Wilkie, Minneapolis, Minn., assignor to Continental Machines, Incorporated, Minneapolis, Minn., a corporation of Minnesota Application June 25, 1941, Serial No. 399,655

7 Claims. (Cl. 206—52)

This invention relates to band saw packages and is an improvement over the package forming the subject matter of the copending application of Robert J. Wilkie, Serial No. 281,211, filed June 26, 1939.

Saw bands of the type with which this invention is concerned are made of highly springy metal and are sold in coils of substantial length.

Prior to the invention forming the subject matter of the aforesaid copending application, no special effort was made to facilitate the handling of such saw bands. The coils were merely wired to retain their coiled condition. As a consequence, stripping a length of band from such a coil was an extremely dangerous undertaking. It could be done safely only by first cutting the wire tie nearest the outer end of the band, allowing the end portion to unwind to the next tie, replacing the cut tie, and then cutting the next tie and repeating the process as often as necessary.

The tediousness of this procedure was a constant temptation to the workmen to take short-cuts which very often resulted in severe injury.

The invention of the aforesaid copending application overcame much of the difficulty encountered in the handling and shipping of such band saw stock, and the present invention seeks the same objectives, namely, the provision of a compact and convenient package for safely shipping and handling saw bands for use on power saws; but in addition has as its object to improve the package primarily by the substitution of novel and improved box sections which are stamped and formed of sheet metal.

The force of a coiled length of band saw stock is considerable. Hence, extreme caution must be exercised to guard against this expansive force bursting the box, and with this thought in mind it is a further object of the present invention to provide an improved manner of locking the box sections together.

Another object of this invention resides in the provision of a box in which a coil of saw band is safely confined to be stripped from the box as needed, and which includes means for holding the required exposed end of the saw band against the adjacent portion of the side wall to thus preclude the objectionable protrusion of the exposed end from the box and insure the maintenance of an adequate length of exposed saw band Still another object of this invention resides in the provision of a simple manner of reinforcing the box sections to permit the same to be stamped and formed from relatively light stock.

A further object of this invention is to provide a band saw package of the character described which is neat in appearance.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate two complete examples of the physical embodiment of the invention constructed in accordance with the best modes so far devised for the practical application of the principles thereof, and in which:

Figure 5 is a partial end view of the package to show the way in which the exposed end of a saw band is held down;

Figure 6 is a perspective view of a length of saw band and showing one manner in which withdrawal of a predetermined length of stock may be facilitated; and Figure 7 is a perspective view similar to Figure 1 but showing a slightly modified embodiment of the invention.

Figure 1:
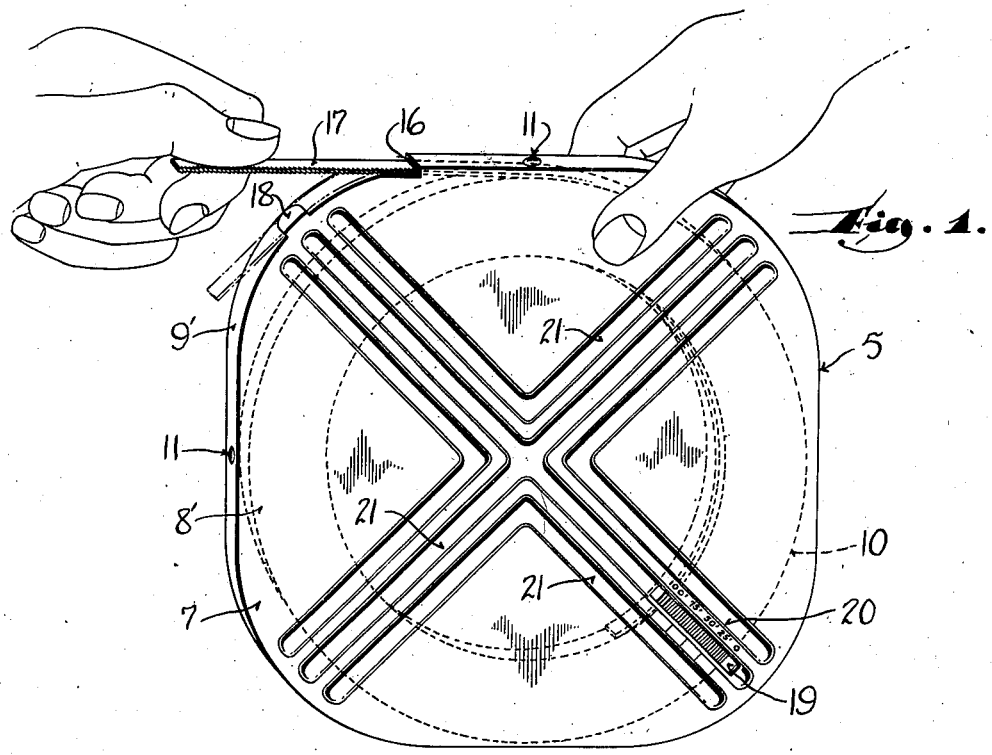
Figure 1 is a perspective view illustrating the preferred embodiment of this invention and showing the manner in which a length of saw stock may be stripped from the coil.

Referring now particularly to the accompanying drawings in which like numerals indicate like parts, the numeral 5 designates generally the box of this invention and which consists of an inner or body section 6 and an outer section or cover 7.

Both box sections are stamped and formed from thin sheet metal and have substantially flat bottom walls 8 and 8' and integral continuous side walls 9 and 9'. The outer section or cover 7 is slightly larger than the inner section 6 and telescopes flatwise thereover.

The box may be of any configuration desired but for convenience in handling is substantially square with round corners.

The flat medial side wall portions are all equidistant from the center of the box so that the outer periphery of a coiled length of saw band 10 tangentially engages all of the medial portions of the side walls.

The confined strength of the coiled saw band 10 due to its springiness and sharp teeth makes it an extremely dangerous instrumentality and requires the utmost care in handling, both during shipment and after it reaches its destination where lengths of the band are periodically stripped from the coil as replacement on band saws becomes necessary.

It is, therefore, essential that the box which contains the coil shall be secure against accidental opening and also that it be so designed as to permit ready closure of the box in packing. To this end the overlapping side walls 9 and 9' have automatically engaged interlocking connections designated generally by the numeral 11. One of these connections is located at the medial portion of each flat section of side wall where it will be most effective against the expansive force of the coiled saw band.

Figure 2:
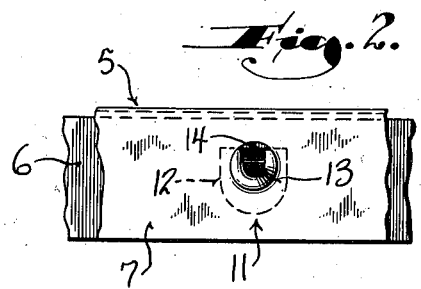
Figure 2 is an enlarged detail view showing one of the interlocking connections by which the box sections are held together.
Figure 3:
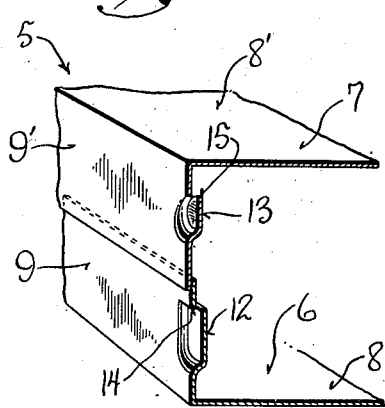
Figure 3 is a perspective cross sectional view through the interlocking connection but before the box sections are closed on each other.
Figure 4:
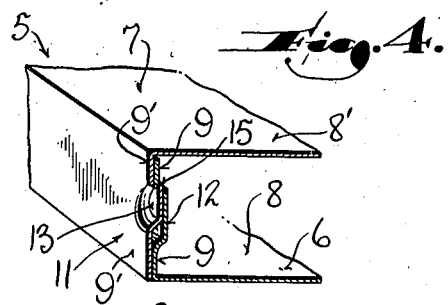
Figure 4 is a view similar to Figure 3, showing the box sections in their closed positions.

The interlocking connections 11, as best shown in Figures 2, 3 and 4, each comprise an indentation 12 in the inner side wall 9 and an indentation 13 in the outer side wall 9'. The indentation 12 is substantially U-shaped with the open end of the U facing the edge of the side wall and sharply defined by a slit or cut through the side wall. This leaves an edge 14 in the side wall 9 spaced down a short distance from its outer edge.

The indentation 13 is substantially round and its edge nearest the bottom wall 7 is likewise sharply defined by a slit or cut through the side wall 9'. Because of the round configuration of the indentation 13, the slit or cut produces a pointed or round-ended tongue 15. This tongue or tang 15 is so positioned with relation to the width of the side wall 9' that when the box sections are closed on each other as shown in Figures 2 and 4, the tongue 15 engages under the edge 14 to hook onto it.

The interlocking connections thus established not only secure the box sections against direct flatwise separation but also hold the overlapping side walls together and prevent disengagement of the connections by either inward or outward lateral force applied to the side walls. In other words, the interlocking connections substantially lock the inner side walls to the outer side walls so that neither inward nor outward force applied thereon affects the connections.

Attention is also directed to the fact that the interlocking connections being located substantially at the center of the flat medial portions of the side walls and projecting slightly inward from the plane of the inner walls, provide raised projections against which the coil of saw band abuts to thus receive the direct thrust of the coil. This insures maintenance of the connections and also facilitates revolving the coil in the box as is necessary to strip off a length of the band.

Substantially at the point of tangency between one flat portion of the overlapping side walls of the box and the adjacent rounded corner the side walls 9 and 9' have aligned openings 16. These openings enable the outer end portion 17 of the coil to project from the box to make possible stripping a desired length of saw band from the coil in the manner shown in Figure 1.

The coil is wound with the teeth of the saw facing inwardly, or in other words, in a direction opposite to that in which the band is pulled during its withdrawal from the box. Consequently the teeth will not catch on the edges of the openings 16 which if permitted would not only interfere with removal of the saw but might very likely tear the edges of the openings.

In stripping a length of saw band from the coil the desired length can be quickly ascertained by code markings on the band as shown in Figure 6, and to maintain an adequate length of exposed band without having it project from the box, a hook 18 is formed on the outer box section under which the projecting end of the band may be engaged as shown in Figure 5.

The length of the band in the coil is conveniently indicated at a window 19 in the cover or outer box section 7 through which the coil is directly visible. Indicia along the length of the window, as for instance, footage designations 20, facilitate roughly predetermining the length of the coiled saw band remaining in the box.

As noted hereinbefore, both box sections are stamped and formed from light sheet metal, and to provide the desired stiffness, reinforcing ribs 21 are pressed into the bottom walls of both box sections. These reinforcing ribs preferably extend diagonally from each rounded corner of the box toward the center and then are directed at right angles toward an adjacent corner. In this manner an exceptionally stiff box section is produced without the use of heavy metal and in addition a neat external appearance is provided.

While it is preferable to form the box sections of sheet metal as described, the objects of the invention are achieved in a broad sense through the use of cardboard box sections as illustrated in Figure 7.

In this case both bottom and cover sections 22 and 23 respectively are formed of cardboard or other similar material and as before telescope flatwise to retain a coiled length of saw band in place therein in the same manner as described.

At one corner of the box aligned openings 24 in the overlapping side walls provide for the projection of the free end of the coil outwardly from the box so that a length of saw band may be stripped from the coil in the manner described.

In this instance, the box sections are held assembled and reinforced against bursting by tangs 35 suitably anchored to the bottom box section and passing through openings 26 in the cover section to be folded or bent over the outer sides of the cover side walls as clearly shown.

A window 27 in the cover section enables visual determination of the amount of coil remaining in the box.

In this form of the invention, however, where the box in square, the projecting end of the saw band protrudes from the adjacent side of the box as distinguished from the preferred embodiment of the invention previously described wherein the hook 13 holds the free end of the band down on the rounded corner where it will be out of the way.

This latter expedient has considerable merit as it enables an adequate length of saw band to be exposed at all times without the objectionable projection of the exposed end beyond the adjacent side of the box.

From the foregoing description taken in connection with the accompanying drawings, it will be readily apparent that this invention provides an exceedingly simple and safe saw band package which not only facilitates shipping of the saw stock but also enables safe stripping of any desired length of stock from the coil.

What I claim as my invention is:

1. A saw band package of the character described comprising: complementary shallow box sections telescoped flatwise one within the other and both sections having flat bottom walls and integral side walls, the side walls of the two sections having aligned openings; a coil of highly springy metal saw band in the box with its outer coil frictionally and tangentially engaging the side walls of the inner box section and the outer end portion of the coil extending tangentially therefrom to project through the aligned openings to enable a length of coil to be pulled out of the box against the tendency of the expansive force of the coiled band to hold the same in place; and interlocking connections between the side walls of the box sections for holding the sections together, said interlocking connections each comprising, incisions in portions of the overlapped side walls extending transversely to the direction of telescoping engagement of the box sections; and nesting male and female indentations in said side wall portions each bounded along one edge by the incision in its side wall portion, the incision formed edges of the indentations facing toward the marginal edge of the side wall having the female indentation, and the incision formed edge of the female indentations being spaced from the incision formed edge of its side wall portion a distance at least equal to the thickness of the projecting edge portion of the male indentation to accommodate the same therebetween, said incisions being of different shapes so that the incision formed edge portion of the male indentation overlaps the incision formed edge portion of the side wall having the female indentation whereby the side walls of the box are held together against flatwise and edgewise separation.

2. A package for shipping and handling flexible highly springy metal saw bands comprising, the combination of: complementary shallow inner and outer box sections telescoped flatwise one within the other, each box section being stamped and formed from sheet metal and having a flat bottom wall and a continuous integral side wall, said side walls having flat medial portions and rounded corners; reinforcing ribs pressed into the flat bottom walls of the box sections; a freely expansible coiled length of highly springy metal saw band in the box with the outer surface of its outer coil frictionally and tangentially engaging the flat portions of said side walls of the inner box section, the free end portion of the outer coil extending tangentially therefrom and being projectible through aligned openings in the overlapped side walls of the box located substantially at the point of tangency of the flat portion of the side wall against which the free end portion of the saw band bears with the adjacent rounded corner to allow a length of the band to be readily pulled out against the tendency of the expansive force of the coiled band to hold the same against displacement; and interlocking connections on the overlapping side walls of the box sections to hold the same together.

3. A package for shipping and handling flexible highly springy metal saw bands comprising, the combination of: complementary shallow inner and outer box sections telescoped flatwise one within the other, each box section being stamped and formed from sheet metal and having a flat bottom wall and a continuous integral side wall, said side walls having flat medial portions and rounded corners; reinforcing ribs pressed into the flat bottom walls of the box sections; a freely expansible coiled length of highly springy metal saw band in the box with the outer surface of its outer coil frictionally and tangentially engaging the flat portions of said side walls of the inner box section, the free end portion of the outer coil extending tangentially therefrom and being projectible through aligned openings in the overlapped side walls of the box located substantially at the point of tangency of the flat portion of the side wall against which the free end portion of the saw band bears with the adjacent rounded corner to allow a length of the band to be readily pulled out against the tendency of the expansive force of the coiled band to hold the same against displacement; and interlocking connections on the overlapping side walls of the box sections to hold the same together, said band being coiled with its teeth pointing in a direction opposite to that in which the band is pulled from the box to preclude having the teeth catch on the edges of the openings as the band is pulled from the box.

4. A saw band package of the character described comprising: complementary shallow box sections telescoped flatwise one within the other and both sections having flat bottom walls and integral side walls, the side walls of the two sections having aligned openings; a coil of highly springy metal saw band in the box with its outer coil frictionally and tangentially engaging the side walls of the inner box section and the outer end portion of the coil extending tangentially therefrom to project through the aligned openings to enable a length of coil to be pulled out of the box against the tendency of the expansive force of the coiled band to hold the same in place; and interlocking connections between the side walls of the box sections for holding the sections together, said interlocking connections each comprising, substantially aligned apertures in portions of the overlapped side walls; and a tongue on the side wall of one of the box sections adjacent to the aperture therein struck out of the plane of said side wall and passing through the aperture in the side wall of the other box section and toward its marginal edge to overlie the edge portion of the aperture in said side wall of the other box section closest to said marginal edge thereof and to engage behind said side wall of the other box section whereby a portion of said other box section adjacent to the aperture therein is confined between said tongue and a portion of its side wall and the side walls are held together against flatwise and edgewise separation, said tongue being automatically projectible through the aperture in the side wall of said other box section upon telescoping said box sections together.

5. In a stamped sheet metal box of the character described: complementary inner and outer box sections, each stamped and formed from a single blank of thin sheet metal and having a bottom wall and integral side walls; interlocking connections on the side walls for holding the box sections together, each of said connections comprising an indentation on the side wall of one box section, said indentation being bounded at its edge nearest the edge of the side wall by a slot through the side wall so as to leave an abutment on the side wall spaced from the edge of the side wall and separated from the slot formed edge of the indentation a distance at least equal to the thickness of the metal from which the box is formed; and a complementary indentation on the side wall of the other box section, said latter indentation having a rounded inner edge cut through the side wall and defining a rounded tongue to engage under said abutment on the first designated side wall and over a surface thereof adjacent to the abutment so that the first designated side wall has its portion adjacent to the abutment thereof held between said other side wall and the indentation of said other side wall.

6. A package for shipping and handling flexible highly springy metal saw band comprising, the combination of: complementary shallow inner and outer box sections telescoped flatwise one within the other, each section having a flat one-piece bottom wall and connecting side walls, the side walls of the outer box section overlapping those of the inner box section, the medial portions of the side walls of the box being flat and substantially equi-spaced from the center of the box, and the side walls of the two box sections having aligned openings near one corner of the box; a freely expansible coiled length of springy metal saw band in the box with its outer coil frictionally and tangentially engaging the flat medial portions of the side walls of the inner box section and exerting a substantial outward force thereon, the free end portion of the outer coil extending tangentially therefrom and being projectible through the aligned openings in the overlapped side walls to allow a length of the band to be pulled out against the tendency of the expansive force of the coiled band to hold the same against displacement, said band being coiled so that the teeth thereon point in the direction opposite that in which the band is pulled from the box to preclude having the teeth catch on the edges of the openings; and means carried by one box section adjacent to the points of tangency of the coil with the side walls of the box to hold the sections securely against separation and prevent the side walls from spreading under the expansive force of the band.

7. A band saw package of the character described comprising: a box consisting of flatwise telescoped bottom and cover sections having overlapping side walls, said box having flat side walls and at least one rounded corner; a coiled length of springy metal saw band confined within the box with its outer periphery frictionally engaging the inner surface of the flat side walls of the bottom box section, the side walls of the box sections having aligned openings adjacent to the point of tangency of one of the flat side wall sections with the rounded corner, through which the outer end portion of the saw band projects to enable stripping a length of saw band from the coil; means for holding the box sections together; and means at the rounded corner for holding the exposed end portion of the saw band against the outer face of the rounded corner to thereby preclude objectionable projection of the saw band from the box while leaving an adequate end portion free to be gripped when a length of saw band is to be stripped from the coil.

ROBERT J. WILKIE.